US006858986B2

(12) United States Patent
Monk

(10) Patent No.: US 6,858,986 B2
(45) Date of Patent: Feb. 22, 2005

(54) PROGRAMMABLE LED VEHICLE MARKER LIGHT ASSEMBLY

(75) Inventor: Christopher Monk, Santa Rosa, CA (US)

(73) Assignee: MITE (Milks Industries Towing Equipment, Inc.), Ooltewah, TN (US)

(*) Notice: Subject to any disclaimer, the term of this patent is extended or adjusted under 35 U.S.C. 154(b) by 0 days.

(21) Appl. No.: 10/392,410

(22) Filed: Mar. 19, 2003

(65) Prior Publication Data

US 2004/0183449 A1 Sep. 23, 2004

(51) Int. Cl.[7] .................................................. H01K 7/00
(52) U.S. Cl. ......................... 315/76; 315/299; 307/10.8
(58) Field of Search ............................. 315/76–77, 291, 315/293, 299, 307; 307/10.1, 10.8; 362/487, 543, 800; 340/815.45

(56) References Cited

U.S. PATENT DOCUMENTS

| | | | | | |
|---|---|---|---|---|---|
| 3,484,598 | A | | 12/1969 | Nitsch | 362/549 |
| 3,692,998 | A | | 9/1972 | Adams | 362/540 |
| 5,299,102 | A | | 3/1994 | Zimmerman | 362/485 |
| 5,420,482 | A | | 5/1995 | Phares | 315/292 |
| 5,599,087 | A | | 2/1997 | Kanno et al. | 362/505 |
| 5,632,551 | A | | 5/1997 | Roney et al. | 362/485 |
| 6,016,038 | A | | 1/2000 | Mueller et al. | 315/291 |
| 6,095,663 | A | | 8/2000 | Pond et al. | 362/247 |
| 6,150,774 | A | | 11/2000 | Mueller | 325/291 |
| 6,340,868 | B1 | | 1/2002 | Lys et al. | 315/185 S |
| 6,380,865 | B1 | * | 4/2002 | Pederson | 340/815.45 |
| 6,459,919 | B1 | | 10/2002 | Lys et al. | 600/407 |
| 6,461,008 | B1 | * | 10/2002 | Pederson | 362/35 |
| 6,462,669 | B1 | * | 10/2002 | Pederson | 340/815.45 |
| 6,614,359 | B2 | * | 9/2003 | Pederson | 340/815.45 |
| 6,623,151 | B2 | * | 9/2003 | Pederson | 362/542 |
| 6,693,551 | B2 | * | 2/2004 | Pederson | 340/815.45 |
| 6,700,502 | B1 | * | 3/2004 | Pederson | 340/815.45 |
| 6,707,389 | B2 | * | 3/2004 | Pederson | 340/815.45 |
| 6,789,930 | B2 | * | 9/2004 | Pederson | 362/545 |
| 2002/0036908 | A1 | * | 3/2002 | Pederson | 362/545 |
| 2004/0032745 | A1 | * | 2/2004 | Pederson | 362/545 |

* cited by examiner

*Primary Examiner*—Thuy Vinh Tran
(74) *Attorney, Agent, or Firm*—Michael P. Mazza

(57) ABSTRACT

A vehicle marker light assembly including a plurality of preferably serially-connected, programmable light unit modules, each module having a microcontroller and a plurality of LEDs, which have a dual function as a marker light and, alternatively, as an emergency or warning light. In a preferred embodiment, microcontrollers of adjacent modules are programmed to communicate instructions to the light unit modules, causing the LEDs to flash in one or more predetermined patterns or sequences. In this embodiment, the light unit modules are configured in longitudinal strips or other desired forms, and are designed to operate on low amounts of current. In another preferred embodiment, a controller providing command instructions to the light unit modules causes flashing of the marker lights in the predetermined patterns or sequences. Preferably, the light unit modules include electrical circuits to provide protection against unwanted electrical noise and transients, and fail-safe circuits to revert a failed light unit module to a marker-only mode and to allow electrical communication to pass through to an adjacent light unit module.

20 Claims, 6 Drawing Sheets

| COLOR CODE | |
|---|---|
| WHITE | GROUND |
| BROWN | 12 VOLTS |
| BLACK | SIGNAL |

| COLOR CODE | |
|---|---|
| WHITE | GROUND |
| BROWN | 12 VOLTS |
| BLACK | SIGNAL |
| ORANGE | SIGNAL |

PROGRAMMABLE LED VEHICLE MARKER LIGHT ASSEMBLY

BACKGROUND OF THE INVENTION

The present invention generally relates to marker lights useful for vehicles. More specifically, the invention utilizes reliable, programmable LED vehicle marker lighting.

Vehicle marker lights have long been used to signal, for example, stranded, emergency (e.g., tow trucks, police or fire vehicles, etc.) or maintenance (e.g., street sweepers, etc.) vehicles, as shown, for example, in U.S. Pat. Nos. 3,484,598, 3,692,998 and 5,299,102. Incandescent lighting systems have traditionally been used for this purpose. But such systems are relatively inefficient and unreliable when compared to light emitting diodes (LEDs), which have an operating life of up to 100,000 hours before significant degradation. Incandescent lighting systems are also subject to vibration, which can interfere with the useful life of such lights. LEDs are not subject to such vibration issues, and use less power, which can translate into less strain on the vehicle electrical system, e.g., less drain on the vehicle battery, longer-lasting, etc. For these reasons, and others, it would be desirable to provide vehicle marker lights which are programmable LED displays utilizing solid state LED technology.

Accordingly, it is an object of the present invention to provide an improved design for vehicle marker lights which is programmable, easy to use, reliable, makes use of LED technology, made of off-the-shelf components and standard circuits, has a long life, and provides a variety of lighting options, e.g., acting as both a marker light as well as emergency flashers, traffic control arrows, turn signals, strobes, etc.

Definition of Claim Terms

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"LED" means a light emitting diode, a p-n junction solid state device which emits optical radiation when forward biased.

"Marker light" means lighting functioning as a marker or clearance light for the vehicle on which it is used.

"Microcontroller" means a small programmable processor for embedded control, such as may be used for timers, appliances, etc.

SUMMARY OF THE INVENTION

The objects mentioned above, as well as other objects, are solved by the present invention, which overcomes disadvantages of prior marker light assemblies, while providing new advantages not previously obtainable with such assemblies.

In a preferred embodiment, a vehicle marker light assembly is provided, consisting of a plurality of light unit modules which are preferably serially-connected, but which may be connected in parallel, and in arrays or other forms. The light unit modules each preferably include a microcontroller and a plurality of LEDs. Each microcontroller may be programmed to provide encoded instructions and encoded algorithms cause the LEDs to light in a predetermined manner. The light unit modules may be serially connected for electrical communication with each other and with a power source located on the vehicle, such as a vehicle battery. Adjacent modules are preferably designed to communicate with each other and, in one embodiment, bidirectional communication can occur. The light unit modules may be connected, as may be expedient for a particular application, using hard wiring, or using remote and/or wireless electrical means. A controller in electrical communication with the microcontrollers on the light unit modules provides command instructions to the microcontrollers on the light unit modules. The controller may be located in the vehicle cab, allowing a vehicle operator to remotely operate the modules and cause them to flash in one or more predetermined patterns and/or sequences.

Each light unit module or array may be shaped and sized in manners suitable for varying applications. A preferred light unit module is a relatively thin and narrow light strip in which, for example, the length is about ten times that of the width. One or more light unit modules may be configured and caused to function as strobes, directional arrows, chaser lights, wig-wags, etc.

In one preferred embodiment, using LED technology, each light unit module may be designed to draw about 100 milliamps or less of current. In one preferred circuit design, up to 24 light unit modules (each having, e.g., 20 LEDs) may be connected to a vehicle battery of 12 volts.

Preferably, the light unit modules utilize various features making them long-lasting and reliable, including solid state design, such as a UV stable lens, molded optics, and a waterproof assembly.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 5:
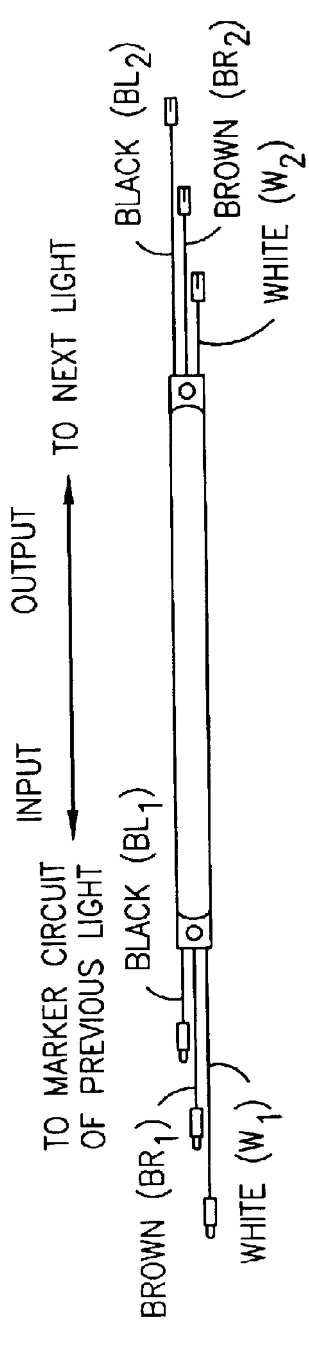
FIG. 5 illustrates one preferred wiring configuration for the light units of the invention.
Figure 6:
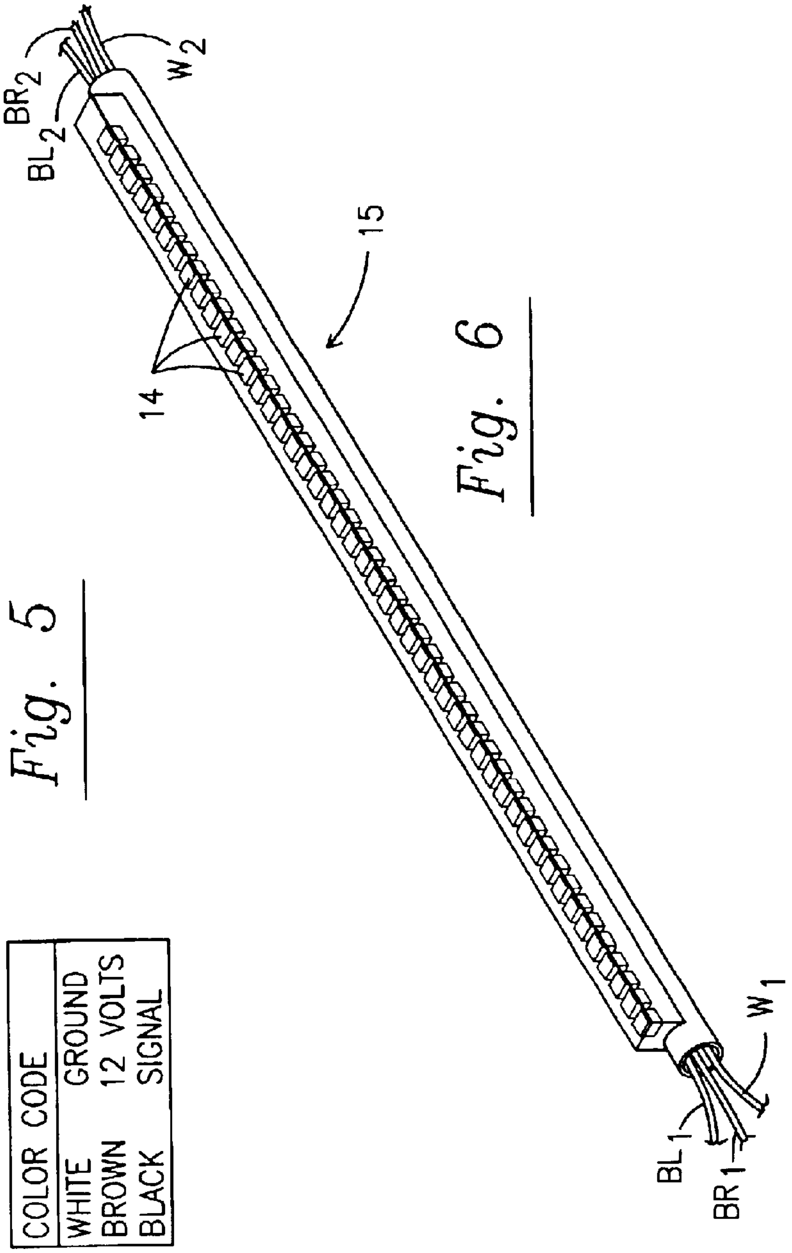
FIG. 6 is a perspective view of a preferred embodiment of the LED marker lights according to the present invention.

Referring first to FIGS. 5–6, a preferred embodiment of the vehicle marker light assembly of the present invention is generally designated by the reference numeral 15. Vehicle marker light unit module 15, also termed here a light array 15 or light strip 15, includes individual LED light units 14 which may be connected in series. In one embodiment, each marker light strip 15 includes a number (e.g., 20) of high-lumen, surface mounted LEDs 14 arranged in a single row to create a solid-state marker light that is preferably thin (e.g., one-half inch wide, one inch high) and relatively long (e.g., 10 inches long). Of course, varying numbers of LEDs may be combined in varying shaped arrays having differing patterns, shapes and sizes, depending on the application. However, thin, long vehicle marker lights are viewed as particularly desirable, both for improved aerodynamics and due to vehicle height/width restrictions.

In a preferred embodiment, LEDs are used in which each light array consumes about 100 milliamps, and should last 5–10 years in normal usage (e.g., such LEDs are available from Lite-On of Taipei, Taiwan, part number LTST-C930KSKT; or Kingbright, City of Industry, Calif., part numbers APTD3216SYC, AM2520SYC03). Preferably, the LEDs use a clear UV stable lens for maximum light transmission, and employ molded optics for providing wide visibility, and a waterproof potted design is used. With these particular LEDs (others may be used, of course), and based on a standard 12-volt automobile battery source, up to 24 lights may be connected in a circuit and sequenced together. These LEDs are durable as well as reliable, tested for use in operating temperatures of −40° F. to 180° F.

Each marker light unit module 15 of the present invention also includes a small microcontroller and a solid-state switch circuit (e.g., available from Zetex, of Chadderton, Oldham, United Kingdom, part number FMMT495). The switch circuit allows the microcontroller to turn the LEDs on and off in a predetermined fashion, depending upon the programming built into the microcontroller. This permits the marker lights to flash, strobe and sequence in a variety of patterns, allowing the lights, e.g., to act as emergency lights, creating additional visibility and warning to other motorists.

A remotely located controller may be used by the vehicle operator to sequence the light arrays in various patterns, as further explained below. For example, the lights may be used as directional arrows, strobes, wig-wags, chase lights, or to flash SOS (using, e.g., Morse Code) for emergencies.

Figure 2:
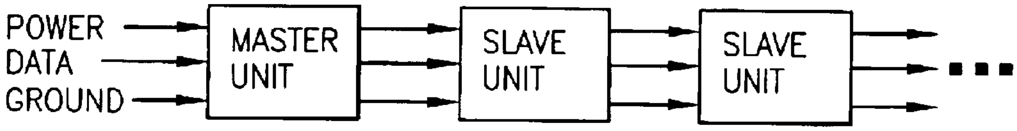
FIG. 2 is a block diagram showing the general architecture of the assembly.

Referring to FIGS. 2 and 5, in a preferred embodiment three wires exit each end of light strip or array 15. A wire may connect to a power/battery source (e.g., brown wire, $BR_1$, $BR_2$), a second to ground (e.g., white wire $W_1$, $W_2$), respectively, and a third (e.g., black wire, $BL_1$, $BL_2$) may be used for communication and control. Each light strip 15 may be designed to plug into another light strip, creating a daisy chain assembly of vehicle marker lights.

During normal operation, light strips 15 may act like any other marker or clearance light. However, when voltage is applied (e.g., by the vehicle battery) to the control wire (i.e., the "flash"/black wire of FIG. 5) of the first light strip connected to the battery/power source in a daisy chain of such light strips, the entire chain of lights may sequence together and flash on and off in (e.g.) a single, pre-programmed sequence, turning the lights into emergency flashers. The lights may continue to flash until the voltage is removed from the control wire of the first light.

A built-in "flash" mode may be used to turn the lights into emergency flashers. The "flash" mode is activated by applying voltage to the "flash" (black) wire, which activates the "flash" mode for all other lights connected together. A preferred flash cycle time is about 1–10 flashes/second and, more preferred, about 5–10 flashes/second. (At about 10–15 flashes/second, the human eye cannot distinguish continuous light from flashing light.)

Each light unit 15 may be protected from standard automotive transients, as further explained below. Additionally, in the event of a microcontroller failure on an individual light strip, a fail-safe circuit may be provided to revert the failed light to a marker-only mode and allow for communication to pass through to the next light, as discussed below.

Figure 1:
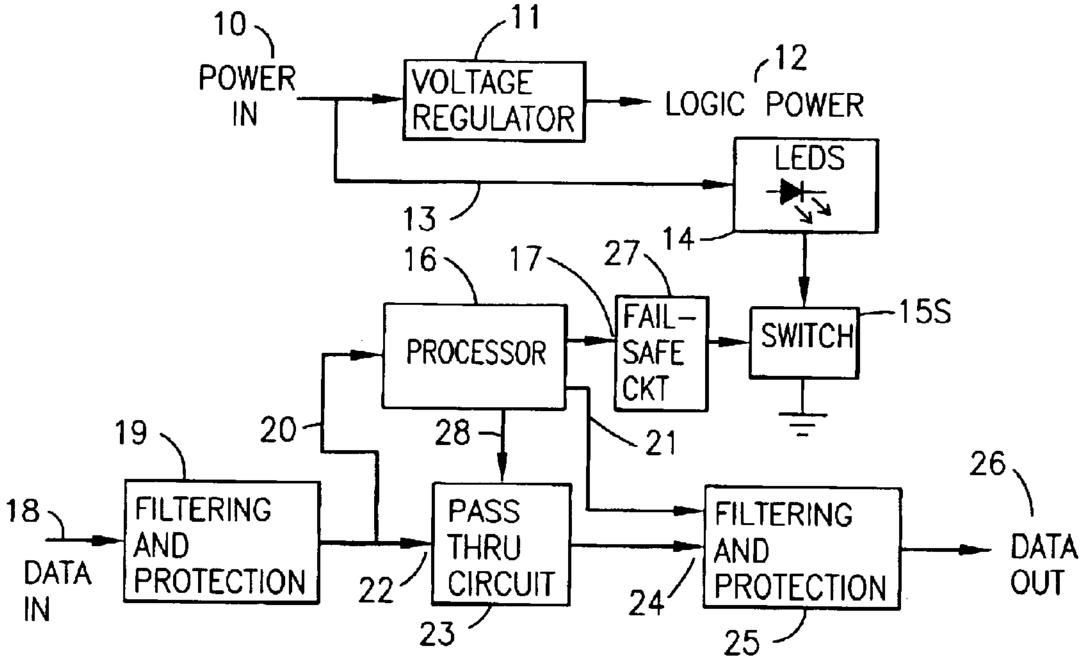
FIG. 1 is a block diagram of one embodiment of the LED marker light assembly of the present invention.

Referring now to FIG. 1, a block diagram is shown of one embodiment of the LED vehicle marker light assembly of the present invention. A typical application involves the serial connection of a plurality of circuits per FIG. 1. Main power 10 is supplied to a set of light emitting diodes 14 and a voltage regulator 11, which in turn supplies logic power 12 to a processor 16 and pass-through circuit 23. LEDs 14 are operated by a switch 15S, which is turned on and off under command of processor 16 via output lead 17. Switch control is further conditioned by fail-safe circuit 27, which can detect operation of processor 16 and will turn on LEDs 14 in the case of a processor failure.

Referring still to FIG. 1, under normal conditions, microprocessor 16 receives encoded control information from an external controller or another serially connected LED marker light unit 10 via data input terminal 18 and data lead 20. Processor 16 operates LEDs 14 according to the decoded data and passes a command code to the next serially connected unit 10 via data out terminal 26. Should processor 16 fail, this will be recognized by pass-through circuit 23 via a loss of signal on an "I'm alive" lead 28 from the processor. Pass-through circuit 23 will then directly route the data in 18 to data out 26, ensuring that the remainder of the lights in the serial chain continue to operate.

Lighting units such as described here may typically operate in an electrically "noisy" and fault prone environment, such as being externally mounted on a vehicle. Therefore, filtering and protection circuits 19 and 25 shown in FIG. 1 provide protection for the electronic components within the unit.

Figure 3:
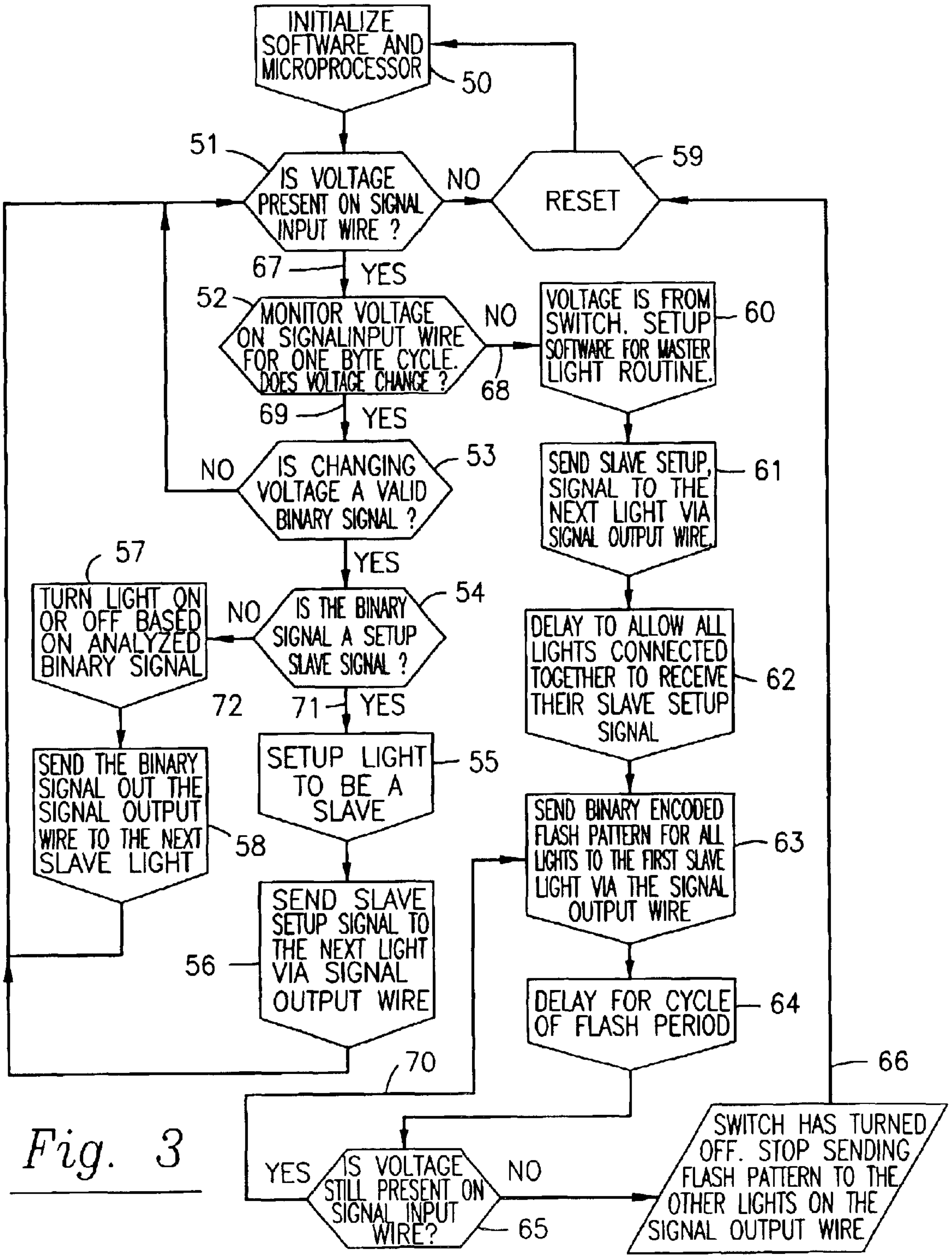
FIG. 3 is a firmware block diagram of the LED marker light assembly.

FIG. 3 shows one embodiment of the data decoding, data forwarding, and LED operating firmware for microprocessor 16. Light units or arrays 15 are typically connected in a serial fashion as shown in FIG. 2, with the first unit being a "master", and being connected to a power source and a switch or a controller. A controller, not shown in the drawings, which may be wireless or wired, and remotely controlled from the vehicle cab, for example, may be capable of sending binary encoded data to the master unit. Application of power causes microprocessor 16 to initialize at 50, and to begin looking for input signals 51. If no signal is detected, the processor is reset 59, and continues to look for input 50, 51. Once a signal is detected 67, it may be a steady voltage 68 or binary data 69. If it is a steady voltage, the first light unit will begin the control of a pre-stored master light operating routine 60 by sending a slave setup code 61 to the next light. The master unit waits a sufficient time 62 for all lights to receive the slave setup code. Then, it sends a flash pattern code to the first slave, causing it to perform the desired flash, and to pass the code to the next slave. The master delays 64 a sufficient time for all slaves to flash, and then repeats 70 the pattern until the steady data input signal is removed at 65, 66.

Still referring to FIG. 3, if the input signal at the master was a binary code, it is first tested for validity 53, and then to determine if it is a slave setup code or a flash code 54. If it is a slave setup code 71, the unit accepts the information 55 and passes it on to the next slave. If it is a flash code 72, the unit operates the light according to the specific flash code 57, and sends the code on 58 to the next slave unit.

In this manner, a variety of flash operations including, for example, different rates, duty cycles, varying code propagation schemes, and propagation delays may be designed and programmed into the processor firmware. These, in turn, can enable an infinite variety of serially connected light operations to be created.

Figure 4:
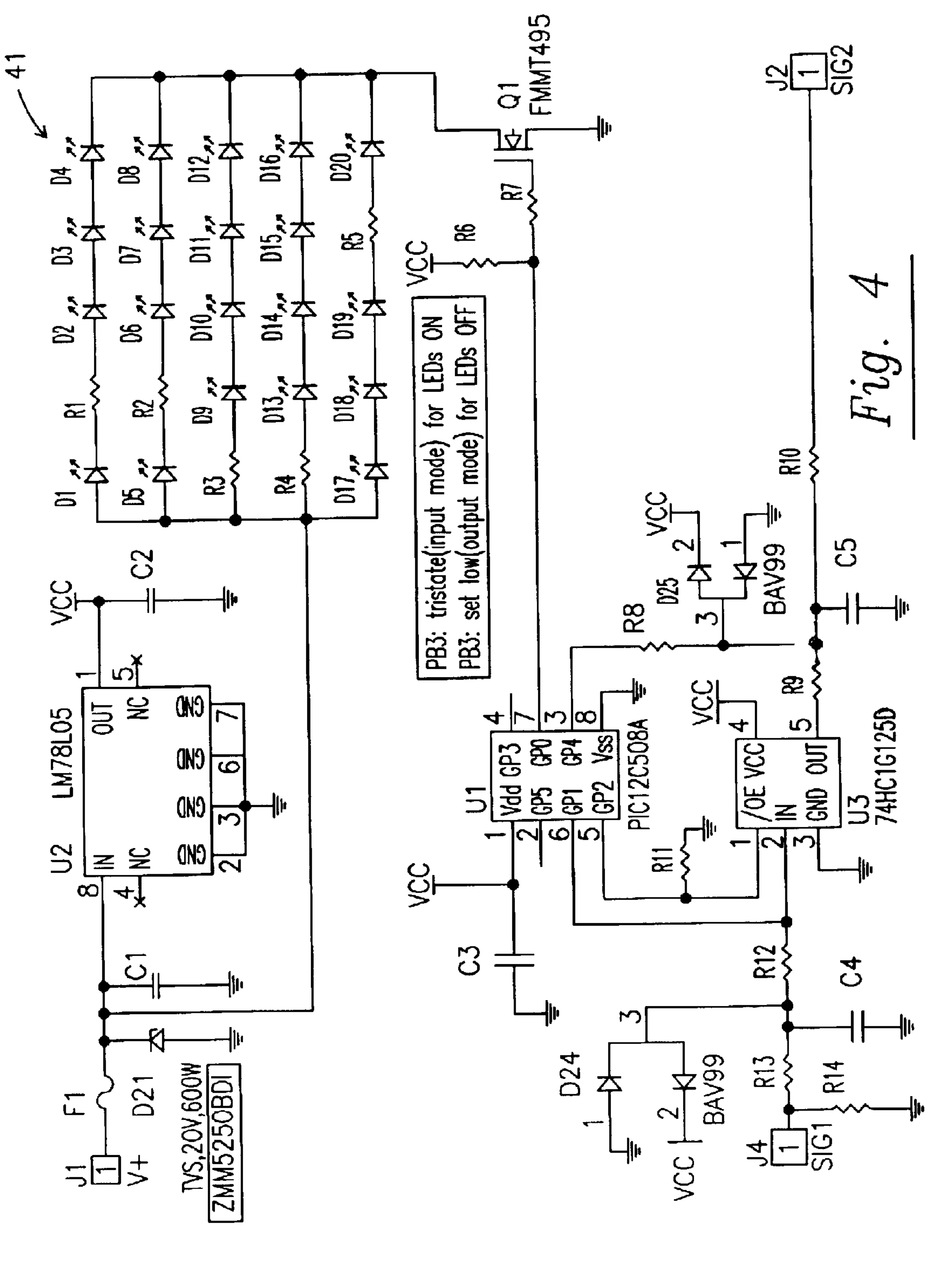
FIG. 4 is a circuit diagram for a preferred embodiment of the LED marker light assembly.

Referring now to FIG. 4, a diagram of an integrated circuit according to a preferred embodiment of the invention is shown. The following Glossary explains acronyms appearing in FIG. 4:

| Glossary | |
|---|---|
| U1, 2, 3 | Integrated circuit identifiers |
| D1, 2, . . . | Diode identifiers |
| LED | Light emitting diode |
| Q1 | Transistor identifier (a FET—Field Effect Transistor) |
| Vcc | Power supply voltage (5 volts in this circuit) |
| GP0–5 | General purpose input/output pins on the microcontroller |
| J1–J4 | Circuit board input/output terminals |
| R1–R14 | resistors |

Referring still to FIG. 4, integrated circuit 41 consists of four basic functional sections. They are: 1) a voltage regulator, U2, supplying +5 volts; 2) the LED section; 3) a microcontroller, U1; and 4) a data pass-through buffer, U3. The circuit receives input power (J1, V+) through a fuse, and regulates it to +5 volts for the microcontroller and buffer circuits. A logic level input signal (Sig1 at J1) appears at an input of the microcontroller (pin 6, GP1), where a program detects and interprets this signal, and operates the Light Emitting Diodes accordingly. The signal will typically be a code specifying a particular LED action, such as flashing at a desired rate. The LEDs are operated by the microcontroller output (pin7, GP0) by driving the voltage at the junction of resistors R6 and R7 high, turning on FET (Field Effect Transistor) Q1, which in turn conducts current through the LEDs D1–D10. R1–R5 provide LED current limiting. The LEDs are turned off by driving the microcontroller output (pin7, GP0) low.

In the particularly preferred embodiment in which battery power of 5 volts is used and 20 LEDs are in each light strip array, exemplary values for the circuit shown in FIG. 4 are as follows: R1–R4 (240 ohm 5% ¼W); R6 (10K); R7 (200); R8–R9 (470); R10 (2K); R11–R13 (10K); R14 (47K); D1–D18 (e.g., part number atdp3216); Q1 (part number ZXMN2A01F); F1 (0.3 amps); C1 (0.33 $\mu$F); C2 (0.01 $\mu$F); C3 (0.1 $\mu$F 16V); C4 (0.01 $\mu$F); C5 (0.01 $\mu$F); LM78L05 (National Semiconductor part number); and PIC12C508A (PIC microcontroller, Microchip part number). Of course, persons of ordinary skill in the art will recognize that other circuit designs, with different values, may be used within the present invention.

Referring still to FIG. 4, in addition to operating the LEDs, microcontroller 16 generates an output signal (pin 3, GP4), which leaves the circuit as SIG2 (J2). This signal acts as the input signal for the next serially connected circuit like this one. The microcontroller can thus forward a code to the next circuit. The code may, for example, be a setup message, or an operational instruction message.

Several protective functions are included in the circuit shown in FIG. 4. Diode D21 is a transient suppressor, protecting the circuit against voltage surges on the power supply input. Resistor/capacitor networks (R9, R10, R12, R13, C4, and C5) filter noise out of the logic signals, and diodes (D24 and D25) limit the logic signals to a voltage range acceptable to integrated circuits U1 and U2.

Still referring to FIG. 4, in the case of microcontroller failure, two fail-safe functions come into effect. First, the LEDs are turned on by resistor R6, providing gate voltage to the switch transistor Q1 if the microcontroller provides no output. Also, buffer circuit U3 (in the preferred embodiment part number MC74VHC1G125 may be used, available from Motorola), which is normally in the tri-state (off/disconnected) mode under microcontroller direction, will turn on and route the input signal through to the output if the microcontroller fails. Thus, other serially connected modules will continue to function properly.

Figure 7:
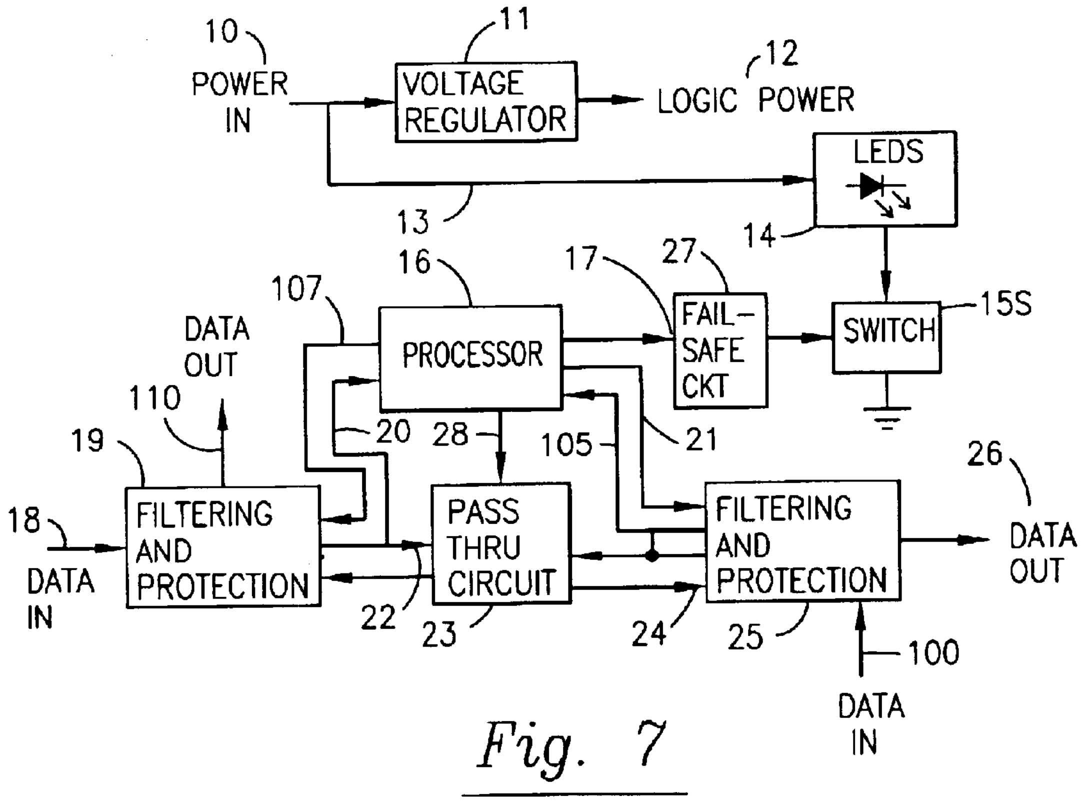
FIGS. 7–10 are alternative embodiments, similar to FIGS. 1, 2, 5 and 6, respectively, of the invention in which bidirectional communication between adjacent light unit modules can occur.
Figure 8:
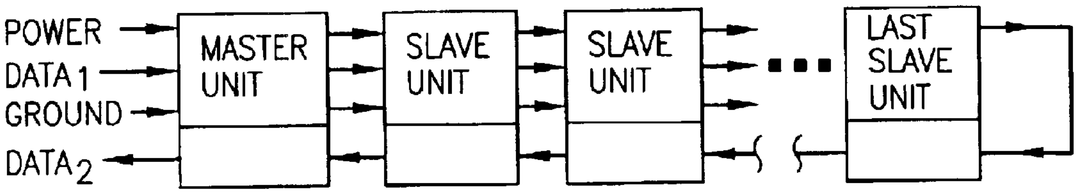
Figure 9:
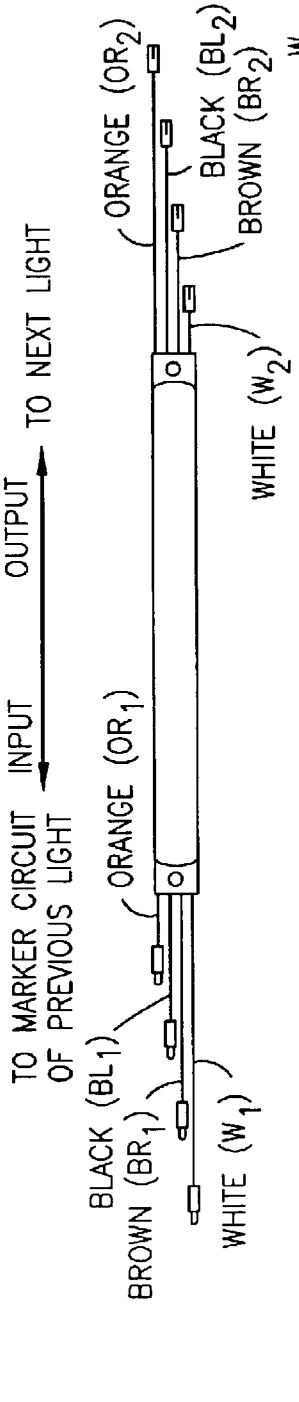
Figure 10:
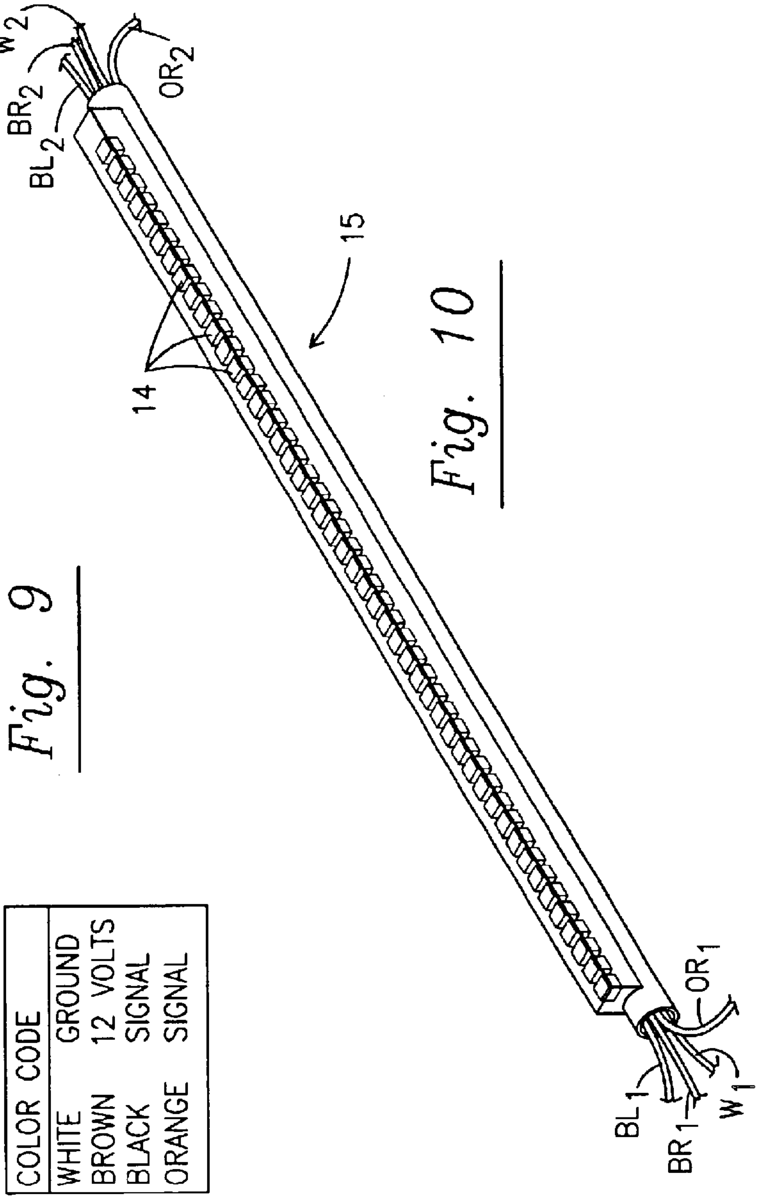

Referring now to FIGS. 7–10, in an alternative embodiment each light unit module 15 connected in series with other modules 15 may be provided with bilateral communication ability, so that adjacent modules can "talk back" to each other. Referring to FIG. 7, an additional data path 100 operating in the reverse direction allows each downstream light to talk back to the next upstream light via signal 105, and then out the processor via signal 107 to data out 110. Referring to FIG. 8, for the last slave unit 15, the data in and data out may be looped as shown. Data 1 (forward) and data 2 (reverse) identify the direction of the data paths. Referring now to FIGS. 9–10, an additional orange wire ($OR_1$, OR2) may be utilized to provide the reverse signaling path. Sending code in both directions allows the designer to implement many more marker light functions.

The above description is not intended to limit the meaning of the words used in the following claims that define the invention. For example, while preferred light unit modules with preferred circuit designs have been described above, persons of ordinary skill in the art will understand that a variety of other designs still falling within the scope of the following claims may be envisioned and used. It is contemplated that future modifications in structure, function or result will exist that are not substantial changes and that all such insubstantial changes in what is claimed are intended to be covered by the claims.

We claim:

1. A light assembly serving a dual role as a marker light, and alternatively as an emergency or warning light for a vehicle, comprising:

a plurality of light unit modules in electrical communication with each other, each of the light unit modules comprising a microcontroller and a plurality of LEDs, the microcontrollers being programmed to communicate instructions to the light unit modules;

wherein in response to receiving the instructions, the light unit modules are caused to flash in one or more predetermined patterns or sequences and wherein the light unit modules function as marker lights, and as emergency or warning lights, at an operator's control and discretion.

2. The light assembly of claim 1, wherein the light unit modules communicate with each other in a serial fashion.

3. The light assembly of claim 1, wherein the light unit modules communicate with each other bidirectionally.

4. The light assembly of claim 1, wherein the light unit modules are serially connected and powered by a power source located on the vehicle, at an upstream end of the serial connection.

5. The light assembly of claim 4, wherein the power source comprises a vehicle battery.

6. The vehicle marker light assembly of claim 5, wherein the light unit modules are connected in series to, and powered by, the vehicle battery.

7. The light assembly of claim 1, wherein the light unit modules comprise relatively thin and narrow light strips.

8. The vehicle marker light assembly of claim 7, wherein the light strips have approximately a 10:1 or greater ratio between length and width.

9. The light assembly of claim 1, further comprising a controller in electrical communication with the microcontrollers on the light unit modules, the controller providing command instructions to the light unit modules and being manipulable by an operator to permit the operator to cause flashing of the marker lights in the predetermined patterns or sequences.

10. The light assembly of claim 9, wherein the light unit modules are serially connected, and the controller is located at an upstream end of the serial connection.

11. The light assembly of claim 9, wherein the controller is located in a vehicle cab remote from the light unit modules.

12. The light assembly of claim 11, wherein the controller communicates with the light unit modules through a wireless electrical communication.

13. The light assembly of claim 1, further comprising a connector allowing the electrical communication between the light unit modules, the connector comprising at least three wires.

14. The light assembly of claim 1, wherein each light unit module draws about 100 milliamps or less of current.

15. The light assembly of claim 1, wherein the light unit modules comprise a UV stable lens.

16. The light assembly of claim 1, wherein the light unit modules comprise molded optics.

17. The light assembly of claim 1, wherein the light unit modules are waterproof.

18. The light assembly of claim 1, wherein each light unit module further comprises one or more electrical circuits to provide protection against unwanted electrical noise and transients.

19. The light assembly of claim 1, wherein each light unit module further comprises one or more fail-safe circuits to revert a failed light unit module to a marker-only mode and to allow electrical communication to pass through to an adjacent light unit module.

20. A light assembly serving a dual role as a marker light, and alternatively as an emergency or warning light for a vehicle, comprising:

a plurality of light unit modules, each of the light unit modules comprising a microcontroller and a plurality of LEDs;

wherein the light unit modules are serially connected to a vehicle power source and are selectively programmable, allowing a vehicle operator to cause the light unit modules to flash in predetermined patterns or sequences functioning as marker lights, and alternatively as emergency or warning lights, at the operator's control and discretion.

* * * * *

UNITED STATES PATENT AND TRADEMARK OFFICE

CERTIFICATE OF CORRECTION

PATENT NO. : 6,858,986 B2
APPLICATION NO. : 10/392410
DATED : February 22, 2005
INVENTOR(S) : Christopher Monk It is certified that error appears in the above-identified patent and that said Letters Patent is hereby corrected as shown below:

On the title page (73) correct Assignee to read:
--Assignee: MITE (Miller Industries Towing Equipment Inc.), Ooltewah, TN (US) --

Signed and Sealed this

Fifth Day of December, 2006

JON W. DUDAS
*Director of the United States Patent and Trademark Office*